May 5, 1942.    H. O. HEM    2,282,052
TESTING DEVICE FOR DETERMINING MASS DISTRIBUTION
Filed June 21, 1940    3 Sheets-Sheet 1
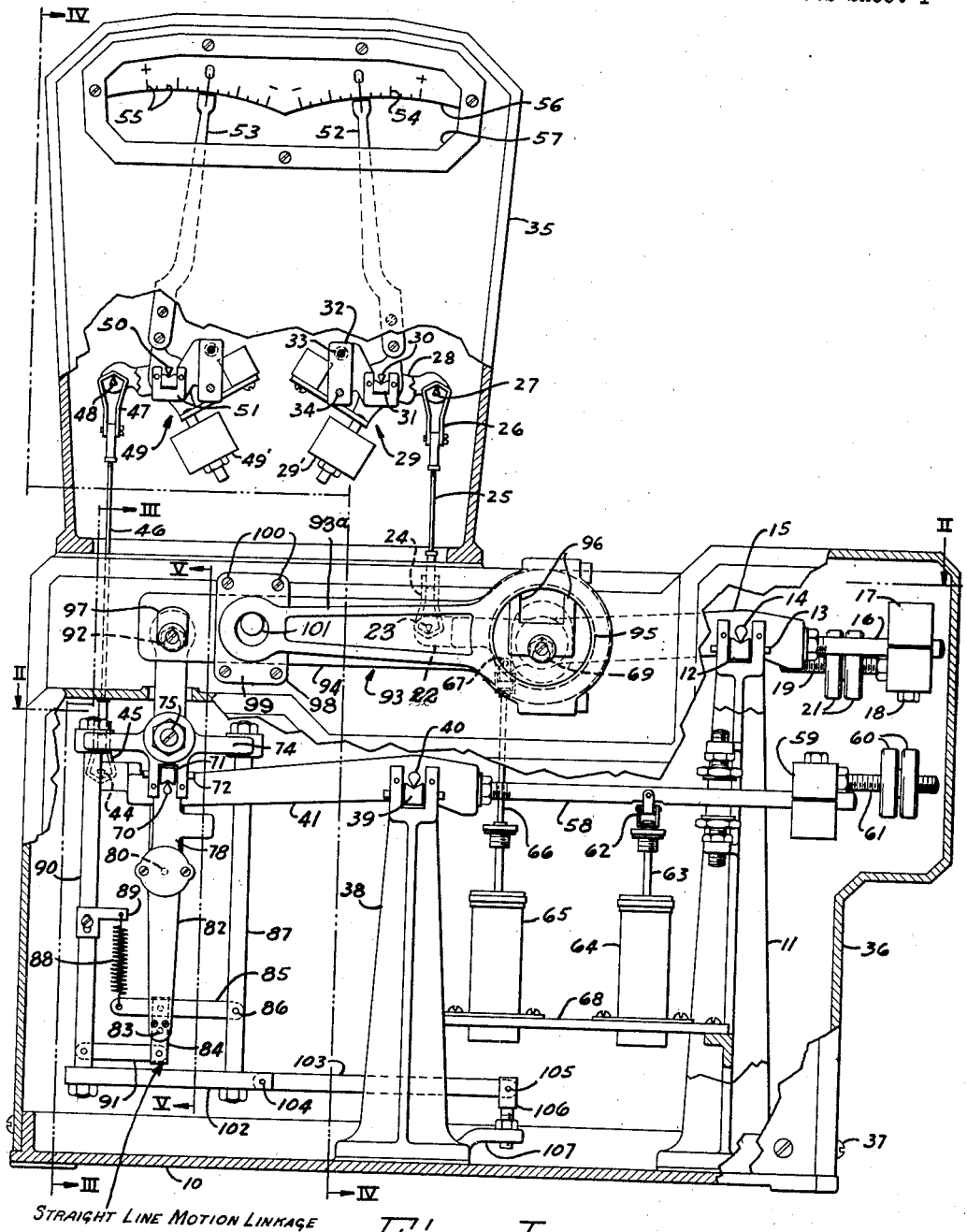
Fig. I
Halvor O. Hem
INVENTOR
BY Marshall & Marshall
ATTORNEYS

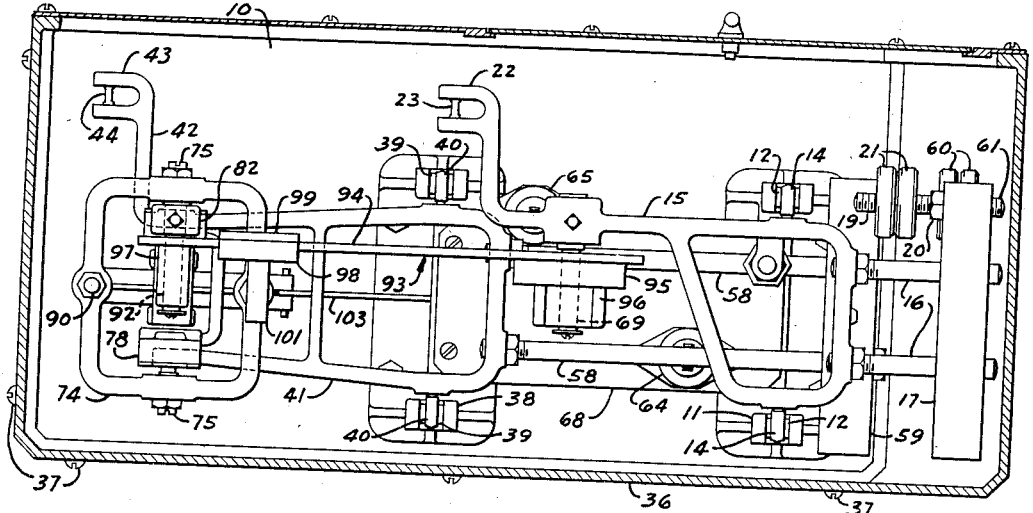
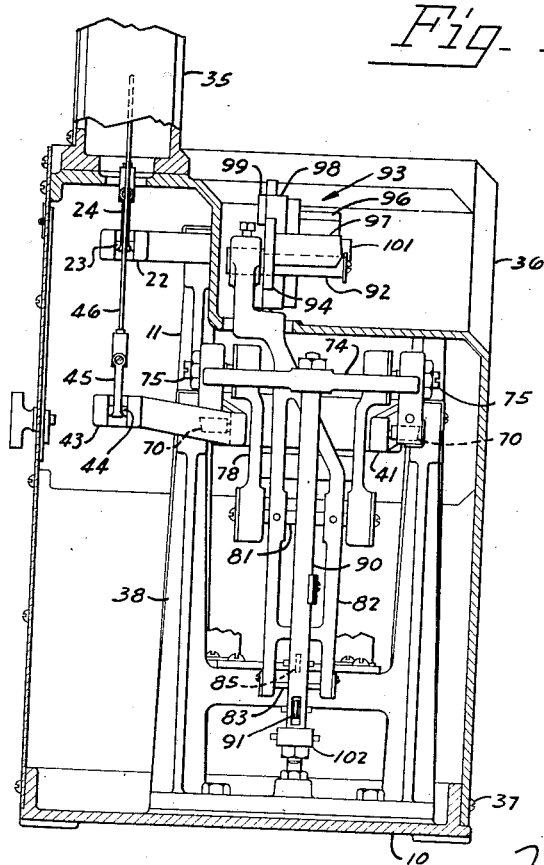

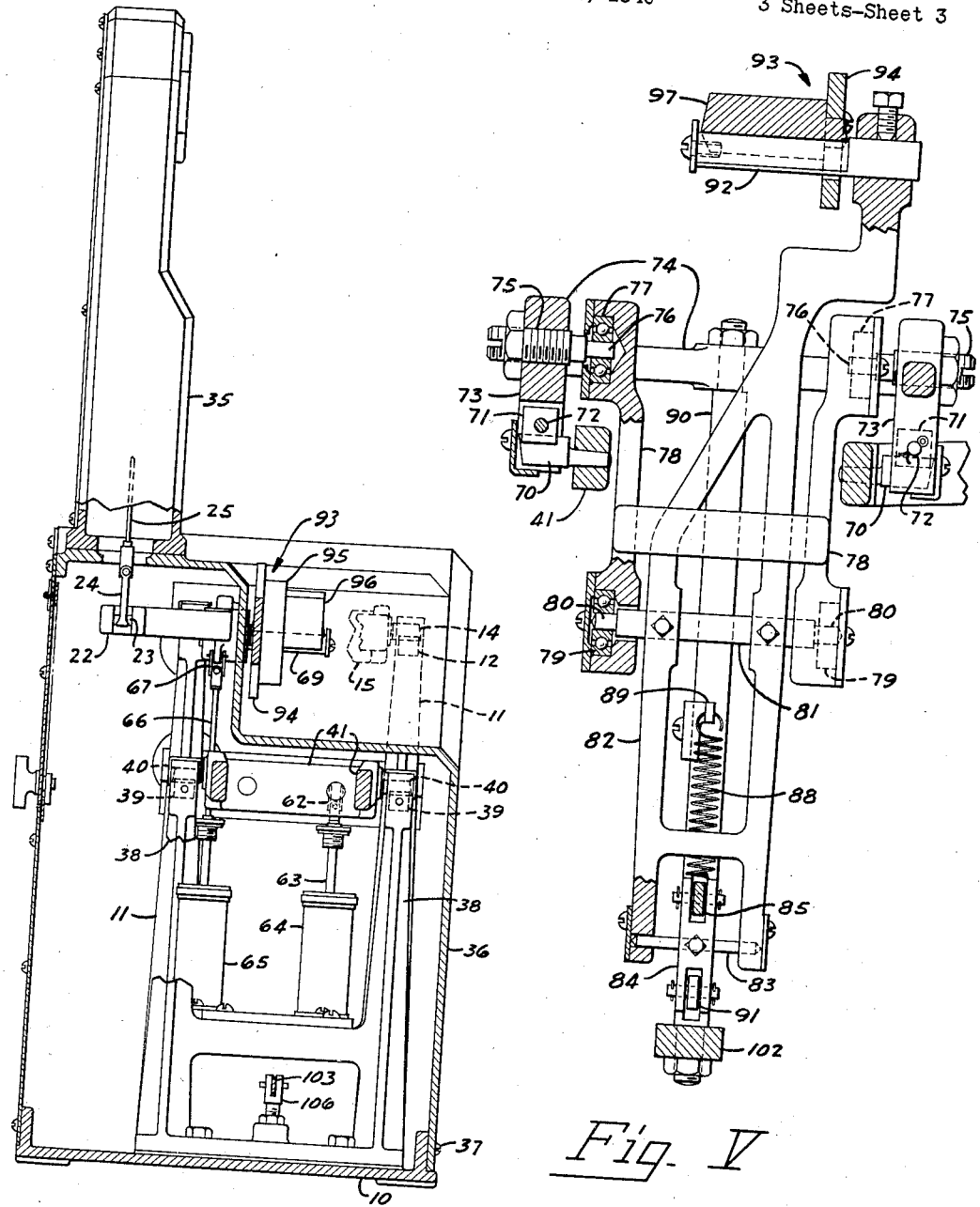

Patented May 5, 1942

2,282,052

UNITED STATES PATENT OFFICE 2,282,052

TESTING DEVICE FOR DETERMINING MASS DISTRIBUTION

Halvor O. Hem, Toledo, Ohio, assignor to Toledo Scale Company, Toledo, Ohio, a corporation of New Jersey Application June 21, 1940, Serial No. 341,738

10 Claims. (Cl. 265—27)

This invention relates generally to testing devices, and more particularly to devices for determining the center of gravity or balance or relationship of the weights of opposite ends of elongated objects, such as connecting rods.

The rotating and reciprocating parts in internal combustion engines, such as are used for automobiles, airplanes, boats, etc., must be very accurately balanced to eliminate vibration to the greatest possible extent. In modern high speed engines a very small difference in weight in one of the rotating or reciprocating parts is sufficient to set up injurious vibrations. Variations in weight or in the location of the center of mass in connecting rods are particularly responsible for much vibration in such engines.

The principal object of this invention is the provision of improved means for determining the distribution of material i. e., the center of gravity in elongated articles such as connecting rods in the assorting or the machining of such articles to a standard.

Another object is the provision of improved means for simultaneously testing both ends of an elongated irregularly shaped article.

Another object is the provision of improved means for determining and indicating deviations from a standard of manufacture for elongated irregularly shaped articles, such as connecting rods.

Another object is the provision of improved means in a testing device for supporting each end of such an elongated article on a separate lever and simultaneously indicating the weight of each end; and, A still further object is the provision of improved means in a device of the type described for substantially maintaining the distance between the points of pivotal attachment of the ends of an elongated article such as a connecting rod to independently mounted levers.

These, and other objects and advantages will be apparent from the following description in which reference is had to the accompanying drawings, illustrating a preferred embodiment of the invention and in which similar reference numerals refer to similar parts throughout the several views.

In the drawings:

Fig. I is a front elevational view of a device embodying the invention, portions of the housing and other members being broken away for clarity.

Fig. II is a plan view sectioned substantially along the line II—II of Fig. I.

Fig. III is a sectional end elevational view sectioned substantially along the line III—III of Fig. I.

Fig. IV is a sectional end elevational view substantially along the line IV—IV of Fig. I; and, Fig. V is an enlarged sectional view substantially along the line V—V of Fig. I and showing the compensating means in greater detail.

Referring to the drawings in detail:

Mounted on a base plate 10, near one of its ends, is an upwardly extending substantially U-shaped fulcrum frame 11. The upper extremities of this fulcrum frame are bifurcated and V bearings 12 are alignably seated upon pins 13 which extend between the arms of the furcation. These V bearings form the supports for fulcrum pivots 14 which extend laterally from a substantially rectangular portion of a lever 15 (Figs. II and I). Extending horizontally from suitable bosses in the end of the rectangular portion of the lever 15 are two spaced studs 16 which adjustably carry a split rectangular counterbalance weight 17, the sections being locked together and clamped to the studs 16 by a bolt 18. This weight 17 may be moved bodily along the studs 16 by loosening the bolt 18. A micrometer adjustment, however, is also provided. This micrometer adjustment comprises a threaded stem 19 which is studded into one of the sections of the counterbalance weight 17 and locked in position by means of a nut 20. Two small weights 21 are adjustably threaded on the stem 19, and may be moved to obtain the final balance. By screwing these weights against each other they may be firmly locked in position.

The free end of the arm of the lever 15 (Fig. II) is bent laterally, at right angles to its longitudinal axis and this extension is provided with a bifurcated nose 22 which extends parallel to the longitudinal axis. A pivot 23, seated in the bifurcated nose 22, engages a V bearing in a stirrup 24 connected, by means of a connecting rod 25, to a similar stirrup 26 which engages a pivot 27 fixed in an angularly extending arm 28 of a pendulum 29. This pendulum, by means of a pivot 30, is rockingly mounted upon bearings 31 in a fulcrum bracket 32 secured and positioned, by means of a screw 33 and a pin 34, to a wall of an indicator casing 35. The casing 35 surmounts a housing 36 which rests upon a ledge of the base plate 10 and is secured thereto by means of a plurality of screws 37.

Also fastened to the base plate 10, spaced from but parallel to the fulcrum frame 11, is a similar through shorter fulcrum frame 38 which, by means of bearings 39 in its upper ends, supports fulcrum pivots 40 of a lever 41. This lever, in its plan view, is substantially U-shaped, one of the arms of the U being provided with an angularly extending arm 42 (Fig. II) having a bifurcated nose 43 in which a pivot 44 is fixed. The pivot 44 engages the lower stirrup 45 of a connecting rod 46 an upper stirrup 47 of which engages a pivot 48 in a pendulum 49. The pendulum 49 is fulcrumed by means of a pivot 50 on a suitable bearing in a bracket 51 similar to and fastened, like the bracket 32, to one of the walls of the indicator casing 35.

The pendulums 29 and 49 are provided with pendulum weights 29', 49' and indicators 52 and 53 respectively. These indicators cooperate with two series of indicia 54 and 55 printed or otherwise marked upon a suitably contoured chart 56, which is fixedly mounted in the upper end of the indicator casing 35 in the plane of the indicators and visible through an opening 57 therein.

The lever 41, similarly to the lever 15, has two rearwardly extending, horizontal studs 58 carrying a counterweight 59 which is similar in construction to the counterweight 17, and this weight is also provided with micrometer adjustment means comprising balance weights 60 threaded upon a stem 61 which projects rearwardly from the weight 59.

One of the studs 58 has connected to it, by means of a clevis 62, a plunger 63 of a dashpot 64. A similar dashpot 65, through a somewhat longer plunger rod 66, is connected as at 67 to the lever 15. These dashpots are mounted on a shelf-like plate 68 extending between the fulcrum frames 11 and 38 and perform the usual function in damping the vibrations of the device.

The lever 15 is provided with a pivot 69 which extends laterally therefrom in a vertical plane adjacent and parallel to a vertical plane passing through the nose pivot 23. The lever 41 is provided with two pivots 70 which extend laterally in a vertical plane adjacent and parallel to the vertical plane passing through the nose pivot 44. The pivot 69 is of such length that it passes through an aperture in a wall of the housing 36 and extends into a space created by a recessed portion of the housing 36 (Fig. IV).

Seated upon the pivots 70, by means of V shaped bearings 71 mounted upon pins 72 extending through spaced depending portions 73, is a skeleton frame 74 which forms a part of a compensating linkage. Fulcrumed upon tenons 76 of studs 75 in the frame 74, by means of ball bearings 77 seated in aligned counterbores in its upper ends, is a link-like member 78. The studs 75 are threaded through apertures located in the frame 74 on a vertical plane passing through the apices of the V's in the bearings 71. The lower ends of this suspended link-like member are also provided with ball bearings 79 in which a short shaft 81 is mounted by means of its tenons 80. This shaft is fixedly positioned in apertures in spaced arms of a vertically positioned supporting frame 82. The lower ends of these arms of the supporting frame 82, by means of apertures therein, engage the ends of a pin 83 extending laterally through the center of a link 84. The upper end of this link, which is bifurcated, pivotally engages a link 85 at a point between the ends thereof. One of the ends of the link 85 is pivoted on a pintle 86 extending across a slot broached in a rod 87 whose upper end is bolted into the frame 74. The opposite end of the link 85 is provided with an aperture into which the lower end of a helical tension spring 88 is hooked. The upper end of this spring engages an aperture in an extending bracket 89 which is adjustably fastened to a rod 90. This rod similarly to the rod 87 is fastened to the frame 74 in spaced relation to the rod 87 on the longitudinal axis of this frame member 74. The purpose of the spring 88 is to obviate lost motion of the linkage. The lower end of the link 84 pivotally engages one end of a short link 91 whose other end is pivoted in a broached slot of the rod 90. The upper end of the supporting frame 82 extends through the wall of the housing 36 which forms the bottom of the recess and at a point which is substantially in the horizontal axis of the pivot 69, it is also provided with a laterally extending pivot 92. The edge of this pivot as well as the edge of pivot 69 face upwardly, and when the longitudinal axes of the levers 15 and 41 are horizontally disposed these edges are in coincidence with a horizontally extending plane.

For the purpose of holding the article to be tested, for example a connecting rod 93a (Fig. I), a support 93 is provided. This support comprises a plate 94 and a substantially circular boss 95 extending laterally therefrom near one of its ends. Fastened to the circular boss, so that it may be interchanged, is a rod support 96. This support, which is interchangeable to receive the crank shaft ends of connecting rods of various diameters, is shaped so as to invariably position the rod longitudinally. The plate 94, the boss 95, as well as the support 96 are apertured so as to form a V bearing which rests upon the pivot 69. The opposite end of this plate is provided with a laterally extending boss 97, its lower surface being milled to form a V bearing for engagement with the pivot 92 which extends from the substantially vertically positioned supporting frame 82.

For the purpose of supporting the wrist pin end of the connecting rod 93a the plate 94, which is rectangular for a considerable portion of its length, has slidably mounted thereon a member 98 which comprises a body grooved to receive the rectangular portion of the plate 94 and a plate 99 that is adapted to be secured to the rear of this body by means of screws 100 so as to clamp the member 98 firmly in adjusted position. This construction permits the member 98, which has a laterally extending pin 101 adapted to enter the wrist pin hole of the connecting rod, to be adjusted along the plate 94 for various lengths of connecting rods.

The lower ends of the rods 87 and 90, depending vertically from the frame 74, are tied together by means of a plate 102 and this assembly is parallelly guided by means of a check link 103 which pivotally engages as at 104 the plate 102 and at its opposite end pivotally engages as at 105 a stud 106, adjustably fixed in an ear 107 extending from the base of the fulcrum frame 38.

The operation of the device is as follows: The connecting rod supporting member 98 is first moved along the plate 94 so that the pin 101 is spaced to properly enter the wrist pin hole of a master connecting rod when the crank shaft end is supported on the bracket 96. This master connecting rod is then placed in position as shown in Fig. I. The counterbalance weights 17 and 59 on the far ends of the levers 15 and 41 are then moved on their respective supporting stems 16 and 58 until the indicators 52 and 53 are approximately in registration with the zero indicia on the chart 56. The final, fine adjustment is made by moving the micrometer weights 21 and 60 in the manner hereinbefore described until the indicators 52 and 53 are accurately aligned with the zero indicia. When this zero balancing operation has been completed the master connecting rod is removed from the support 93 and a rod whose condition of balance is to be determined is placed thereon. If the weight of this rod and the location of its center of gravity is exactly the same as that of the master rod, forces of the same magnitude act on the pendulums and the indicators 52 and 53 will again point to the zero indicia in the series 54 and 55 on the chart 56. When a connecting rod is placed on the support 93 in which the center of gravity is not correctly located, i. e., one end is heavier than the corresponding end of the master rod, the lever supporting that end will rock through a greater angle until the additional weight is counterbalanced by the pendulum. If, for example, the crank shaft end is heavier, the pendulum weight 29' will move upwardly through a greater angle and the indicator 52 will point to an indicium on the "plus" side of the series of indicia 54 of the chart 56. Since the graduations in the series 54—55 are calibrated, the operator will instantly observe the numerical value of the weight of that end of the connecting rod, and the indicator 53 will show a deficiency of weight on the "minus" side of the series of indicia 55 on the chart if the total weight of the rod is correct.

When the levers 15 and 41, upon the application of a connecting rod on the support 93, rock through different angles away from their normal balance position the positions of the pivots 69 and 70 relative to each other have a tendency to change. To compensate for this tendency and to substantially prevent this change in the distance between these pivots, so that the pivots 69 and 92 will not "bind" in their bearings the vertical upwardly extending frame 82, in which the pivot 92 is fixed, together with the link-like frame 78 forms substantially a "Scott Russell" straight line motion linkage in which the usual sliding block is replaced by a "Watt" straight line motion linkage, which comprises the links 85, 91 and link 84 to the center of which the lower end of the frame 82 is pivotally connected. This mechanism compensates for any change in the distance between the pivots 69 and 92.

The embodiment of the invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a pair of levers, a pair of force counterbalancing and force indicating means, one of said pair of force counterbalancing and indicating means being operatively connected to one of said pair of levers and the other of said pair of force counterbalancing and indicating means being operatively connected to the other of said pair of levers, one of said pair of levers being rockingly supported in a plane below the plane of rocking support of the other of said pairs of levers, means on the upper one of said levers for supporting one end of an article of which the center of gravity is to be tested and a straight line motion linkage pivotally mounted on the lower one of said levers for supporting the opposite end of such article and each of said force indicating means being adapted to indicate the condition of balance of that one of said pair of levers to which it is connected.

2. In a device of the class described, in combination, a pair of levers, a pair of force counterbalancing and force indicating means, each of said pair of said force counterbalancing and indicating means being operatively connected to one of said pair of levers, one of said pair of levers being rockingly supported in a plane below the plane of rocking support of the other of said pair of levers, means on the upper one of said pair of levers for supporting one end of an article of which the center of gravity is to be tested and which a straight line motion linkage pivotally mounted a straight line motion linkage pivotally mounted on the lower one of said levers and extending into the plane of rocking support of the upper one of said levers for supporting the opposite end of such article and each of said force indicating means being adapted to indicate the condition of balance of that one of said pair of levers to which it is connected.

3. In a device of the class described, in combination, a pair of levers having fulcrums, means for supporting said levers on such fulcrums, means for balancing said levers about such fulcrums and said levers being in substantial parallel relation when in balanced condition, a counterbalancing mechanism and associated indicating means operatively connected to each of said pair of levers, means associated with each of said levers for supporting the opposite ends of an elongated article to be tested on said device, said supporting means being correctly spaced when such levers are in such substantial parallel relation and said supporting means including means for substantially maintaining such correct spacing when said levers assume a nonparallel relation.

4. In a device of the class described, in combination, a pair of levers having fulcrums, means for supporting said levers on such fulcrums, means for balancing said levers about such fulcrums and said levers being in substantial parallel relation when in balanced condition, a counterbalancing mechanism and associated indicating means operatively connected to each of said pair of levers, means associated with each of said levers for supporting the opposite ends of an elongated article, said supporting means being correctly spaced when such levers are in such substantial parallel relation and said supporting means including a straight line motion linkage for substantially maintaining such correct spacing when said levers assume a non-parallel relation.

5. In a device of the class described, in combination, a pair of levers rockably supported to oscillate in substantial parallelism when the device is in balance, one of said pair of levers being supported in a plane below the plane of support of the other of said pair of levers, a force counterbalancing pendulum and balance indicating means operatively connected to each of said pair of levers, a vertical frame pivotally connected to the lower one of said pair of levers and extending into the plane of the upper one of said pair of levers, means connected to the upper end of said levers, means connected to the upper end of said levers, means connected to the upper one of said article, means connected to the upper one of said pair of levers for supporting the other end of such article and means comprising a plurality of links for imparting movement to the upper end of said vertical frame auxiliary to the movement of that one of said pair of levers to which the frame is pivotally connected to substantially compensate for an out-of-balance condition of said pair of levers.

6. In a device of the class described, in combination, a pair of levers of the first order rockably supported to assume a parallel relation when the device is in balance and to assume a non-parellel relation when the device is out of balance, one of said pair of levers being supported in a plane below the plane of support of the other of said pair of levers, a force counterbalancing pendulum and balance indicating means operatively connected to one end of each of said pair of levers, a pivot in the upper one of said pair of levers spaced from the point of its connection to its force counterbalancing pendulum and means for supporting an elongated article, the balance of which is to be tested, said means including a vertically positioned frame operatively mounted on the lower end of said pair of levers and extending upwardly into the plane of support of the other of said levers, a pivot in the upper end of said frame, a plate having bearings for engaging said pivot in the upper of said pair of levers and said pivot in the upper end of said frame and means on said plate for positioning and supporting such elongated article.

7. A device for determining the center of gravity of elongated articles, in combination, a base, a lever rockingly supported on said base, a second lever rockingly supported on said base below the plane of support of said first lever, a force counterbalancing pendulum operatively connected to each of said levers, an indicator fixed to each of said pendulums, a horizontally positioned frame pivotally mounted upon said second lever, a link-like member dependingly pivoted on said horizontally positioned frame, a vertically positioned frame pivotally mounted on said link-like member and extending upwardly into the plane of support of said first lever, means extending downwardly from said horizontally positioned frame and rigidly connected thereto and a plurality of links extending between the lower end of said vertically positioned frame and said downwardly extending means, a check link pivotally extending between said downwardly extending means and said base, an elongated article support pivotally supported on the upper end of said vertically positioned frame and on said first lever so that each end of said elongated article support independently partakes of the movement of one of said levers, said vertically positioned frame, said link-like member and said plurality of links forming means whereby the upper end of said vertically positioned frame is adapted to have motion auxiliary to the motion of said second lever with which said frame is operatively connected.

8. In a device of the class described, in combination, a pair of levers of the first order rockably supported to oscillate in substantial parallelism when the device is in balanced condition and through arcs of different magnitude when the device is in an out-of-balance condition, one of said pair of levers being supported in a plane below the plane of support of the other one of said pair of levers, a force counterbalancing means and associated indicating means operatively connected to each of said pair of levers, means for supporting an elongated article, said means comprising a pivot in one of said pair of levers, a vertically positioned frame operatively mounted on the other one of said pair of levers and having a pivot, a plate having bearings for engaging said pivot in said vertically positioned frame and said pivot in the other of said pair of levers, means on said plate for positioning and supporting such elongated article and means on each of said levers for counterbalancing the dead weight of such elongated article, said plate and said frame.

9. In a device of the class described, in combination, a pair of levers of the first order rockably supported to oscillate through arcs of equal magnitude when said device is in balance and to oscillate through arcs of unequal magnitude when the device is out of balance, one of said levers being supported in a plane below the plane of support of the other of said levers, a force counterbalancing means and associated balance indicating means operatively connected to one end of each of said levers, a pivot in the upper one of said levers, means for supporting an elongated article, said means including a vertically positioned frame operatively connected to the lower one of said levers and extending upwardly into the plane of support of the upper one of said levers, a pivot in the upper end of said vertically positioned frame, a plate having bearings for engaging said pivot in said upper one of said levers and said pivot in the upper end of said vertically positioned frame, means on said plate for positioning and supporting such elongated article, means on each of said levers for counterbalancing the dead weight of such elongated article, said plate and said frame and means comprising a parallel motion linkage for substantially compensating for a change in the distance between said pivot in the upper end of said vertically positioned frame and said pivot in said upper lever when said levers oscillate through arcs of unequal magnitude.

10. A device for determining the distribution of material in elongated articles, in combination, a rockingly supported lever, a second lever rockingly supported in a plane below the plane of support of said first lever, a pair of force counterbalancing pendulums, independent connections between each of said levers and said force counterbalancing pendulums, a horizontal frame having rigidly connected depending members pivotally supported on the second of said levers, a link-like member pivotally supported on said horizontal frame, a vertical frame pivotally supported on said link-like member and extending upwardly into the plane of support of said first lever, a parallel motion linkage between such members rigidly connected to said horizontal frame and the lower end of said upwardly extending vertical frame, a member extending between the upper end of said upwardly extending vertical frame and said first lever for supporting an elongated article, means adjustably mounted on each of said levers for causing a condition of balance of said device when such elongated article is being supported upon said supporting means, said means for supporting such elongated article comprising a plate, means for pivotally engaging said upwardly extending frame and said first lever, a fixed laterally extending member for positioning and holding one end of such elongated article and a member mounted adjustably on said plate for holding the other end of such elongated article, and said horizontal frame pivoted on said second lever with such rigid depending members, said link-like member, said upwardly extending frame and said parallel motion linkage constituting means for substantially maintaining constant the distance between the points of pivotal connection of said member for supporting such elongated article.

HALVOR O. HEM.